United States Patent
Suess et al.

(10) Patent No.: US 11,087,003 B2
(45) Date of Patent: Aug. 10, 2021

(54) SCALABLE PRE-ANALYSIS OF DYNAMIC APPLICATIONS

(71) Applicant: Oracle International Corporation, Redwood Shores, CA (US)

(72) Inventors: Joern Guy Suess, Brisbane (AU); Rebecca Jane O'Donoghue, Brisbane (AU); Nicholas John Allen, Westlake (AU)

(73) Assignee: Oracle International Corporation, Redwood Shores, CA (US)

( * ) Notice: Subject to any disclaimer, the term of this patent is extended or adjusted under 35 U.S.C. 154(b) by 211 days.

(21) Appl. No.: 16/112,220

(22) Filed: Aug. 24, 2018

(65) Prior Publication Data
US 2020/0065497 A1 Feb. 27, 2020

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC . G06F 21/566; G06F 21/577; G06F 2221/033
See application file for complete search history.

(56) References Cited

U.S. PATENT DOCUMENTS

| | | | |
|---|---|---|---|
| 10,032,031 B1* | 7/2018 | Sharifi Mehr | G06F 21/577 |
| 10,489,375 B1* | 11/2019 | McClintock | G06F 16/2365 |
| 2017/0220806 A1* | 8/2017 | Munoz | G06F 21/577 |
| 2017/0337123 A1* | 11/2017 | Wang | G06F 21/563 |

OTHER PUBLICATIONS

Jens Dietrich et al., "Giga-Scale Exhaustive Points-to Analysis for Java in Under a Minute"; Proceedings of the Conference on Object-Oriented Programming Systems, Languages, and Applications (OOPSLA); pp. 535-551; Pittsburgh, PA; Oct. 25-30, 2015 (17 pages).

Salvador Martinez et al., "Model-based Analysis of Java EE Web Security Configurations"; Proceedings of the 8th International Workshop on Modeling in Software Engineering (MiSE); pp. 55-61; Austin, Texas; May 16-17, 2016 (7 pages).

(Continued)

*Primary Examiner* — Alexander Lagor
*Assistant Examiner* — Wu V Tran
(74) *Attorney, Agent, or Firm* — Ferguson Braswell Fraser Kubasta PC

(57) ABSTRACT

A method may include dividing code into trusted and untrusted components, and identifying a dynamic invocation in a first component of the code. The first component may be an untrusted component. The method may further include extracting dynamic information from the dynamic invocation, and identifying, using the dynamic information and metadata describing a dynamic behavior of the code, a target for the dynamic invocation. The target may correspond to a second component of the code. The method may further include determining that the target matches the dynamic invocation, and in response to determining that the target matches the dynamic invocation, adding, to a call graph generated from the code, an edge from the dynamic invocation to the target.

15 Claims, 10 Drawing Sheets

(56) References Cited

OTHER PUBLICATIONS

Pierre Parrend, "Enhancing Automated Detection of Vulnerabilities in Java Components"; International Conference on Availability, Reliability, and Security (ARES); pp. 216-223; 2009 (8 pages).

Anas Shatnawi et al., "Analyzing Program Dependencies in Java EE Applications"; IEEE/ACM 14th International Conference on Mining Software Repositories (MSR); pp. 64-74; 2017 (11 pages).

V. Benjamin Livshits et al., "Finding Security Vulnerabilities in Java Applications with Static Analysis"; Proceedings of the 14th USENIX Security Symposium; pp. 271-286; 2005 (16 pages).

Christian Kirkegaard et al., "Static Analysis for Java Servlets and JSP"; Static Analysis Symposium (SAS); 2005 (23 pages).

Omer Tripp et al., "TAJ: Effective Taint Analysis of Web Applications"; Proceedings of the 30th ACM SIGPLAN Conference on Programming Language, Design, and Implementation (PLDI); pp. 87-97; Dublin, Ireland; Jun. 15-20, 2009 (11 pages).

* cited by examiner

Metadata 450

Listing 1: ExamplePG.xml

```
1  <oa:pageLayout
2      controllerClass="com.example.webui.ExampleCO"
3      amDefName="com.example.server.ExampleAM" ...>
4      ...
5  </oa:pageLayout>
```

Listing 2: ExampleAM.xml

```
1  <AppModule
2      Name="ExampleAM"
3      ComponentClass="com.example.server.ExampleAMImpl" ...>
4      ...
5  </AppModule>
```

Component Class 452

FIG. 4B

Code 460 

Listing 3: ExampleAMImpl.java
```
1  package com.example.server;
2
3  import oracle.apps.fnd.framework.server.OAApplicationModuleImpl;
4
5  public class ExampleAMImpl extends OAApplicationModuleImpl {
6
7      public void doSomething(String str, boolean bool) {
8          System.out.println("Something");
9      }
10
11 }
```
Target A 464a — Architectural Specification 462

Listing 4: OtherAMImpl.java
```
1  package com.other.server;
2
3  import oracle.apps.fnd.framework.server.OAApplicationModuleImpl;
4
5  public class OtherAMImpl extends OAApplicationModuleImpl {
6
7      public void doSomething(String str, boolean bool) {
8          System.out.println("Something");
9      }
10
11 }
```
Target B 464b

FIG. 4C

Code
460

Listing 5: ExampleCO.java

```java
 1  package com.example.webui;
 2
 3  import oracle.apps.fnd.framework.webui.OAControllerImpl;
 4  import oracle.apps.fnd.framework.webui.OAPageContext;
 5  import oracle.apps.fnd.framework.webui.beans.OAWebBean;
 6  import oracle.apps.fnd.framework.OAApplicationModule;
 7
 8  public class ExampleCO extends OAControllerImpl {
 9
10      public void processRequest(OAPageContext context, OAWebBean bean) {
11          OAApplicationModule am = getApplicationModule(bean);
12          Serializable[] params = {"str", true};
13          Class[] paramTypes = {String.class, Boolean.class};
14
15          am.invokeMethod("doSomething", params, paramTypes);
16      }
17
18  }
```

Dynamic Invocation 468

Application Module Instantiation Point 466

FIG. 4D

SCALABLE PRE-ANALYSIS OF DYNAMIC APPLICATIONS

BACKGROUND

Large-scale software applications often contain dynamically generated content or links between software components. For example, Servlets, Java Beans, and Java Server Pages (JSPs) may be combined to create dynamically generated HTML pages, where the underlying program elements may be exposed through parameters passed on invocation. Dynamic characteristics present challenges when performing static analyses of such applications. For example, a call graph that models execution paths through an application cannot be completely generated (e.g., when performing a static analysis) without knowledge of the dynamic behavior of the application. In addition, an incomplete call graph may interfere with the identification of security vulnerabilities. Conventional approaches to modeling execution paths in the presence of dynamic behavior include custom analysis and manual configuration of static analysis tools, which may result in substantial additional effort and complexity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including dividing code into trusted and untrusted components, and identifying a dynamic invocation in a first component of the code. The first component is one of the untrusted components. The method further includes extracting dynamic information from the dynamic invocation, and identifying, using the dynamic information and metadata describing a dynamic behavior of the code, a target for the dynamic invocation. The target corresponds to a second component of the code. The method further includes determining that the target matches the dynamic invocation, and in response to determining that the target matches the dynamic invocation, adding, to a call graph generated from the code, an edge from the dynamic invocation to the target.

In general, in one aspect, one or more embodiments relate to a system including a repository configured to store code, metadata describing a dynamic behavior of the code, and a call graph generated from the code, a memory coupled to a processor, and a code splitter, executing on the processor and using the memory, configured to divide the code into trusted and untrusted components. The system further includes a static rewriter, executing on the processor and using the memory, configured to identify a dynamic invocation in a first component of the code. The first component is one of the untrusted components. The static rewriter is further configured to extract dynamic information from the dynamic invocation, and identify, using the dynamic information and the metadata, a target for the dynamic invocation. The target corresponds to a second component of the code. The static rewriter is further configured to determine that the target matches the dynamic invocation, and in response to determining that the target matches the dynamic invocation, add, to the call graph, an edge from the dynamic invocation to the target.

In general, in one aspect, one or more embodiments relate to a non-transitory computer readable medium including instructions that, when executed by a processor, perform: dividing code into trusted and untrusted components, and identifying a dynamic invocation in a first component of the code. The first component is one of the untrusted components. The instructions further perform: extracting dynamic information from the dynamic invocation, and identifying, using the dynamic information and metadata describing a dynamic behavior of the code, a target for the dynamic invocation. The target corresponds to a second component of the code. The instructions further perform: determining that the target matches the dynamic invocation, and in response to determining that the target matches the dynamic invocation, adding, to a call graph generated from the code, an edge from the dynamic invocation to the target.

Other aspects of the invention will be apparent from the following description and the appended claims.

BRIEF DESCRIPTION OF DRAWINGS

FIG. 4A, FIG. 4B, FIG. 4C, FIG. 4D, FIG. 4E, and FIG. 4F show examples in accordance with one or more embodiments of the invention.

DETAILED DESCRIPTION

Figure 1:
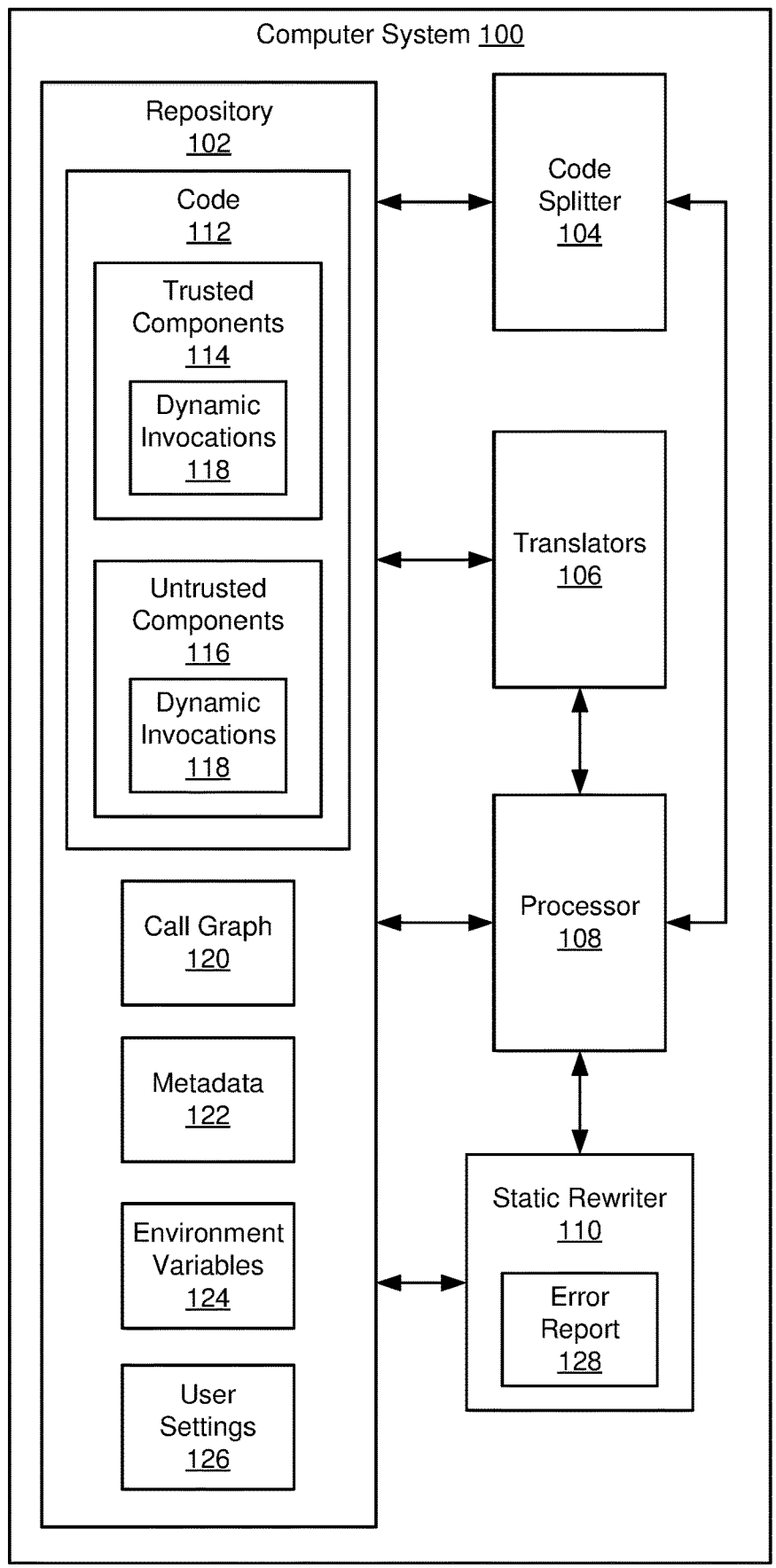
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a method, system, and computer-readable medium for analyzing code with dynamic behavior. The code may be analyzed for security vulnerabilities, including vulnerabilities for SQL injection or cross site scripting attacks. In one or more embodiments, the code is divided into trusted and untrusted components. The analysis may focus on the untrusted components, thus improving scalability. Scalability may be further improved by replacing calls to trusted components with stubs. In one or more embodiments, the analysis matches dynamic invocations to targets (e.g., methods or functions) using metadata external to the code that configures the dynamic behavior of the code. In one or more embodiments, dynamic invocations are statements whose runtime behavior depends on information external to the code. For example, the dynamic invocation may correspond to an architectural specification (e.g., an interface or package), and the target may implement the architectural specification. Other examples of dynamic invocations include reflective invocations (e.g., the method invoke of the Java reflection facility). Metadata may name a component (e.g., a class) of the code to be used when implementing an architectural specification.

Edges from dynamic invocations to matched targets may be added to a call graph generated from the code. Thus, without executing the code, the call graph may be made more precise and complete using metadata to resolve dynamic invocations to targets. If metadata is missing or fails to match the dynamic invocation, the call graph may be overapproximated by adding edges from the dynamic invocation to multiple possible targets, by leveraging environment variables (e.g., the Java Classpath variable) to search for matching targets.

FIG. 1 shows a computer system (100) in accordance with one or more embodiments of the invention. As shown in FIG. 1, the computer system (100) includes a repository (102), a code splitter (104), translators (106), a processor (108), and a static rewriter (110). In one or more embodiments, the computer system (100) takes the form of the computing system (500) described with respect to FIG. 5A and the accompanying description below, or takes the form of the client device (526) described with respect to FIG. 5B. In one or more embodiments, the processor (108) takes the form of the processor (502) described with respect to FIG. 5A and the accompanying description below.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes code (112). In one or more embodiments, the code (112) may be any collection of source code including various software components. That is, the code (112) may be any collection of computer instructions (e.g., statements) written in a human-readable programming language. The code (112) may be transformed by a compiler into binary machine code. Compiled machine code may then be executed by a processor (e.g., contained in the computer system (100)) in order to execute the software components generated from the code (112). In one or more embodiments, the code (112) may be any collection of object code (e.g., generated by a compiler) or another form of the code (112). For example, the code (112) may be an archive file that packages compiled components.

In one or more embodiments, the code (112) includes trusted components (114) and untrusted components (116). In one or more embodiments, trusted components (114) are portions of the code (112) that are considered to be safe. Libraries and frameworks may be examples of trusted components (114). In one or more embodiments, a static analysis of the code (112) may omit the analysis of trusted components (114). In one or more embodiments, trusted components (114) are any portions of the code (112) that are exempted from an analysis of the code (112).

In one or more embodiments, untrusted components (116) are portions of the code (112) that are considered to be potentially unsafe. For example, untrusted components (116) may include user-defined code. In one or more embodiments, untrusted components (116) include portions of the code (112) that receive input from and/or send output to an external source (e.g., code that may be vulnerable to an external attack). For example, untrusted components (116) may include code that dynamically generates web pages, such as Java Server Pages (JSPs). The untrusted components (116) may be any portions of the code (112) that are not part of the trusted components (114).

In one or more embodiments, trusted components (114) and/or untrusted components (116) are defined based on user settings (126). For example, the user settings (126) may specify one directory in a file system of the computer system (100) that includes trusted components (114), and another directory in the file system that includes untrusted components (116).

In one or more embodiments, trusted components (114) and untrusted components (116) include dynamic invocations (118). In one or more embodiments, dynamic invocations (118) are statements whose runtime behavior depends on information external to the code (112). Dynamic invocations (118) may be reflective invocations, such as method invocations supported by a reflection capability that enables code to modify its structure and/or behavior at runtime. For example, the Java reflection facility provides reflective calls, such as the method invoke. In one or more embodiments, the runtime behavior of dynamic invocations (118) depends on metadata (122) and/or environment variables (124). In one or more embodiments, a target for a dynamic invocation (118) may be resolved using metadata (122) and/or environment variables (124). The target for the dynamic invocation (118) may be a method, function, procedure, etc.

In one or more embodiments, a dynamic invocation (118) may correspond to an architectural specification of the code (112). The architectural specification may specify behavior without specifying how the behavior is implemented. In one or more embodiments, the behavior of the architectural specification may be implemented in different ways, using different components of the code (112). One example of an architectural specification is an interface, as illustrated in the code snippet below:

public interface A { public String getMsg( );}

Interface A shown above does not specify an implementation for the abstract method getMsg, only that a string output is generated by whatever concrete method implements getMsg. There may be different components of the code that implement interface A in different ways. For example, different classes may include different concrete methods that implement the abstract method getMsg to generate different string outputs. The concrete methods that implement an abstract method may be referred to as target methods. The class that actually implements interface A at runtime may depend on external information (e.g., metadata (122) and/or an environment variable (124)). Another example of an architectural specification is an abstract class that does not define implementations of its abstract methods.

In one or more embodiments, the call graph (120) includes nodes each corresponding to a statement in the code (112). The flow of control between statements may be indicated via edges between nodes. In one or more embodiments, the call graph (120) may be part of an intermediate representation of the code (112) that is compiled into executable machine code. In one or more embodiments, a static analysis (e.g., a security analysis) may be performed on the intermediate representation of the code (112).

In one or more embodiments, the call graph (120) includes zero or more edges between each dynamic invocation (118) and zero or more potential targets of the dynamic invocation (118). For example, the potential targets may be invoked at runtime as a result of invoking the dynamic invocation (118), depending on external information such as metadata (122) and/or environment variables (124).

In one or more embodiments, metadata (122) includes any information used to configure the dynamic (e.g., runtime) behavior of the code (112). There may be a specific procedure associated with each piece of metadata (122) that is used to resolve the dynamic behavior of the code (112). In one or more embodiments, metadata (122) may be used to identify a target for a dynamic invocation (118). For example, metadata (122) may name a component (e.g., a class) to be used when implementing an architectural specification of the code (112). In one or more embodiments, metadata (122) is external to the code (112). For example, the metadata (122) may be stored in a file (e.g., an eXtensible Markup Language (XML) file) that is separate from the code (112). Metadata (122) may be matched to framework-related annotations, such as the @Autowired and @Component annotations of the Spring framework, when evaluating potential targets to use at runtime to implement an architectural specification.

In one or more embodiments, environment variables (124) are parameters of the computer system (100). For example, an environment variable (124) may be a search path (e.g., the Java Classpath variable) that specifies one or more locations in a file system of the computer system (100). The search path may be used when attempting to resolve a class name to a target that implements the corresponding class. More generally, an environment variable (124) may indicate a context to be used when resolving a name referenced in the code (112). For example, an environment variable (124) may indicate a namespace to be used when resolving a class name, method name, or variable name referenced in the code (112).

In one or more embodiments, user settings (126) are parameters of the computer system (100) that are configurable by a user. For example, a user setting (126) may specify one or more locations in a file system of the computer system (100) to use when identifying trusted components (114). Similarly, a user setting (126) may specify one or more locations in a file system of the computer system (100) to use when identifying untrusted components (116). For example, user settings (126) may specify that both libraries and frameworks are untrusted components (116) (e.g., in the context of a specific static analysis).

Continuing with FIG. 1, in one or more embodiments, the code splitter (104) may be implemented in hardware (e.g., circuitry), software, firmware, and/or any combination thereof. In one or more embodiments, the code splitter (104) may include functionality to divide the code (112) into trusted components (114) and untrusted components (116). The code splitter (104) may include functionality to represent the trusted components (114) and untrusted components (116) in a format (e.g., class files) amenable for further analysis.

In one or more embodiments, the translators (106) may be implemented in hardware (e.g., circuitry), software, firmware, and/or any combination thereof. In one or more embodiments, the translators (106) may include a compiler that transforms the code (112) into machine code. The compiler may be a computer program designed to transform source code written in a programming language, or intermediate representation, into machine code that is capable of being executed in a virtual machine. In one or more embodiments, the compiler includes functionality to translate an intermediate representation of the program into machine code that the virtual machine is configured to execute. For example, the compiler may include functionality to create machine code that, when executed in lieu of direct execution of an intermediate representation, improves the execution speed of the code (112). In one or more embodiments of the invention, the compiler includes functionality to perform dynamic compilation of operations or functions as the program is executing (e.g., just-in-time (JIT) compilation).

In one or more embodiments, a translator (106) may include functionality to translate (e.g., compile) one or more untrusted components (116) to an intermediate representation (e.g., an intermediate representation that includes a call graph (120)). In one or more embodiments, a translator may translate class files corresponding to untrusted components (116) to an intermediate representation.

Continuing with FIG. 1, in one or more embodiments, the processor (108) includes functionality to execute the code (112). In one or more embodiments, the processor (108) includes functionality to execute the code splitter (104), the translators (106), and/or the static rewriter (110).

In one or more embodiments, the static rewriter (110) may be implemented in hardware (e.g., circuitry), software, firmware, and/or any combination thereof. In one or more embodiments, the static rewriter (110) may include functionality to identify and analyze dynamic invocations (118). The static rewriter (110) may include functionality to add one or more edges to a call graph (120) based on matching one or more targets to a dynamic invocation (118).

In one or more embodiments, the static rewriter (110) may include functionality to generate an error report (128). The report (128) may include a log of dynamic invocations (118) for which no matching targets were found. The report (128) may be stored as a document capable of being accessed by an interested entity (e.g., a programmer).

While FIG. 1 shows a configuration of components, other configurations may be used without departing from the scope of the invention. For example, various components may be combined to create a single component. As another example, the functionality performed by a single component may be performed by two or more components.

Figure 2:
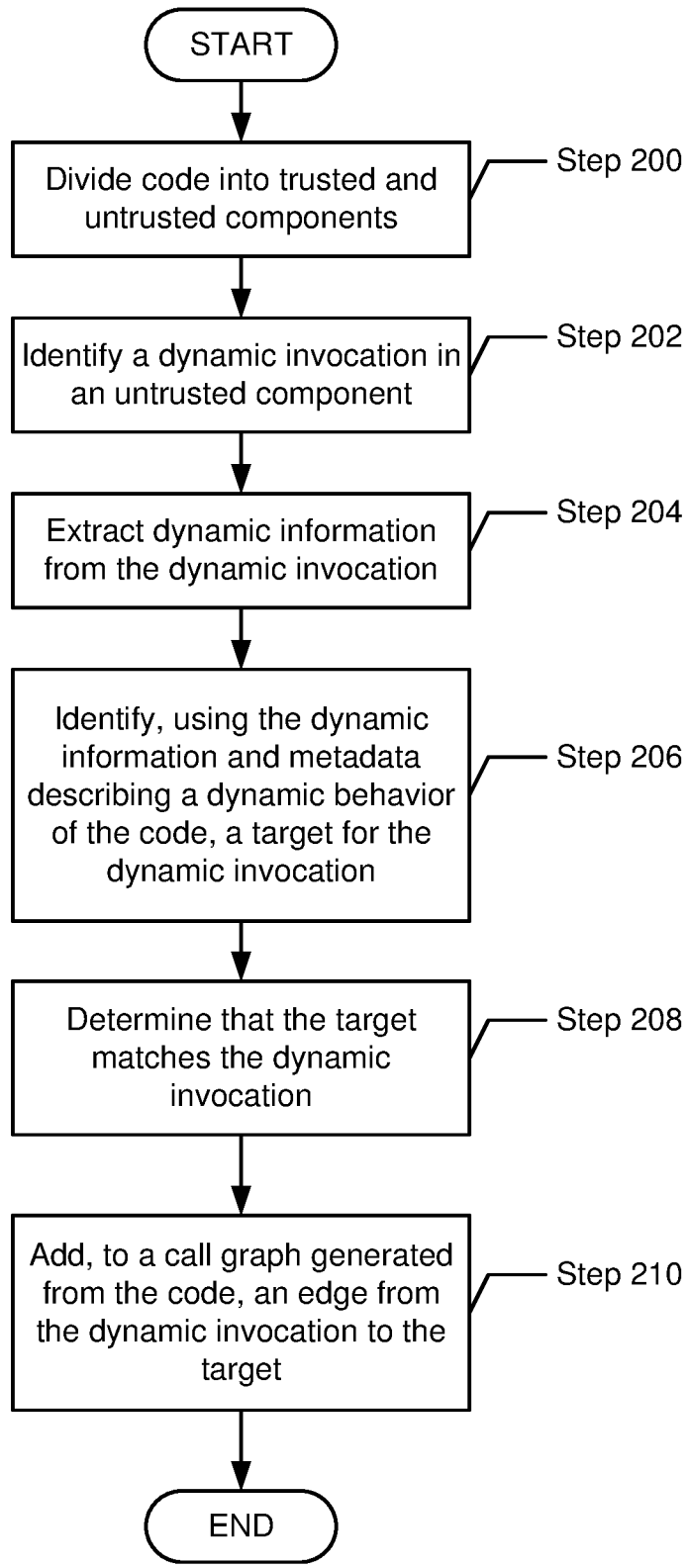
FIG. 2 and FIG. 3 show flowcharts in accordance with one or more embodiments of the invention.

FIG. 2 shows a flowchart in accordance with one or more embodiments of the invention. The flowchart depicts a process for analyzing code. One or more of the steps in FIG. 2 may be performed by the components (e.g., the code splitter (104), translators (106), or static rewriter (110)) of the computer system (100), discussed above in reference to FIG. 1. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, the code is divided into trusted and untrusted components. In one or more embodiments, the code splitter places the trusted components at a location (e.g., a directory) in a file system of the computer system indicated by a user setting. Similarly, the code splitter may place the untrusted components at a location in the file system indicated by another user setting.

In one or more embodiments, a translator may reduce the size of an untrusted component by replacing one or more calls from the untrusted component to trusted components with stubs. For example, a translator may replace, with stubs, calls in untrusted components to web server internals that support Java Server Pages (JSPs), since the server internals are presumed to be safe (i.e., trusted components). Eliminating further analysis of calls to trusted components may improve the performance of analyzing the untrusted components, without detracting from the precision or completeness of the analysis.

In Step 202, a dynamic invocation in a component of the code is identified. In one or more embodiments, the component is an untrusted component. That is, to improve performance, the static rewriter limits its focus to dynamic invocations in untrusted components.

In one or more embodiments, the dynamic invocation may be a reflective call, such as the method invoke in Java. Alternatively, the dynamic invocation may be indicated via an architectural specification, such as an interface or package in Java. In addition, the dynamic invocation may be indicated via a framework-related annotation, such as the @Autowired annotation in the Spring framework. For example, dynamic invocations may be identified using lists of known reflective calls and architectural specifications (e.g., specific to a programming language) and a list of known annotation keywords (e.g., specific to a framework).

In Step 204, dynamic information is extracted from the dynamic invocation. In one or more embodiments, the dynamic information includes an identifier. For example, the identifier may correspond to a name of a potential target of the dynamic invocation. In one or more embodiments, the dynamic information includes a signature that includes a series of parameters each having a type. If dynamic information cannot be extracted from the dynamic invocation, then the static rewriter may report an error.

In Step 206, a target for the dynamic invocation is identified using the dynamic information and metadata describing a dynamic behavior of the code. The target may correspond to a component of the code. In one or more embodiments, the metadata includes an identifier of a component of the code that matches the identifier extracted from the dynamic invocation in Step 204 above. For example, the target may be a method or function of a class that is annotated with the identifier included in the metadata.

In one or more embodiments, to improve the efficiency of processing the metadata, the metadata is first preprocessed to remove information that does not relate to a dynamic behavior of the code.

In Step 208, it is determined that the target matches the dynamic invocation. In one or more embodiments, the target matches the dynamic invocation when the target is potentially reachable within the scope of the dynamic invocation and the target has a signature that matches the signature of the dynamic information extracted in Step 204 above. For example, a target is potentially reachable within the scope of the dynamic invocation when the target is included within a component of the code that implements the dynamic invocation. In one or more embodiments, the signature of the target matches the dynamic information when the number, position, and types of parameters of the target match the number, position, and types of parameters of the dynamic information. For example, both the dynamic information and matching target may specify 3 parameters, the first 2 parameters of type integer, and the third parameter of type string.

In Step 210, in response to determining that the target matches the dynamic invocation, an edge from the dynamic invocation to the target is added to a call graph. A translator may generate the call graph from the code. Thus, the static rewriter may statically determine (i.e., without executing the code) a call graph edge between the dynamic invocation and the target.

The process described herein was used to pre-process large-scale applications prior to running a static security analysis. The edges added to the call graph enabled the static analysis to avoid analyzing irrelevant execution paths. Furthermore, the static analysis was able to identify security vulnerabilities in the code at edges added to the call graph. Thus, it was possible to apply the static analysis to applications that previously had not been analyzable due to the lack of scalable and precise analysis tools. The result was the identification of several security flaws that had not been detected by other means, with a low false positive rate.

Figure 3:
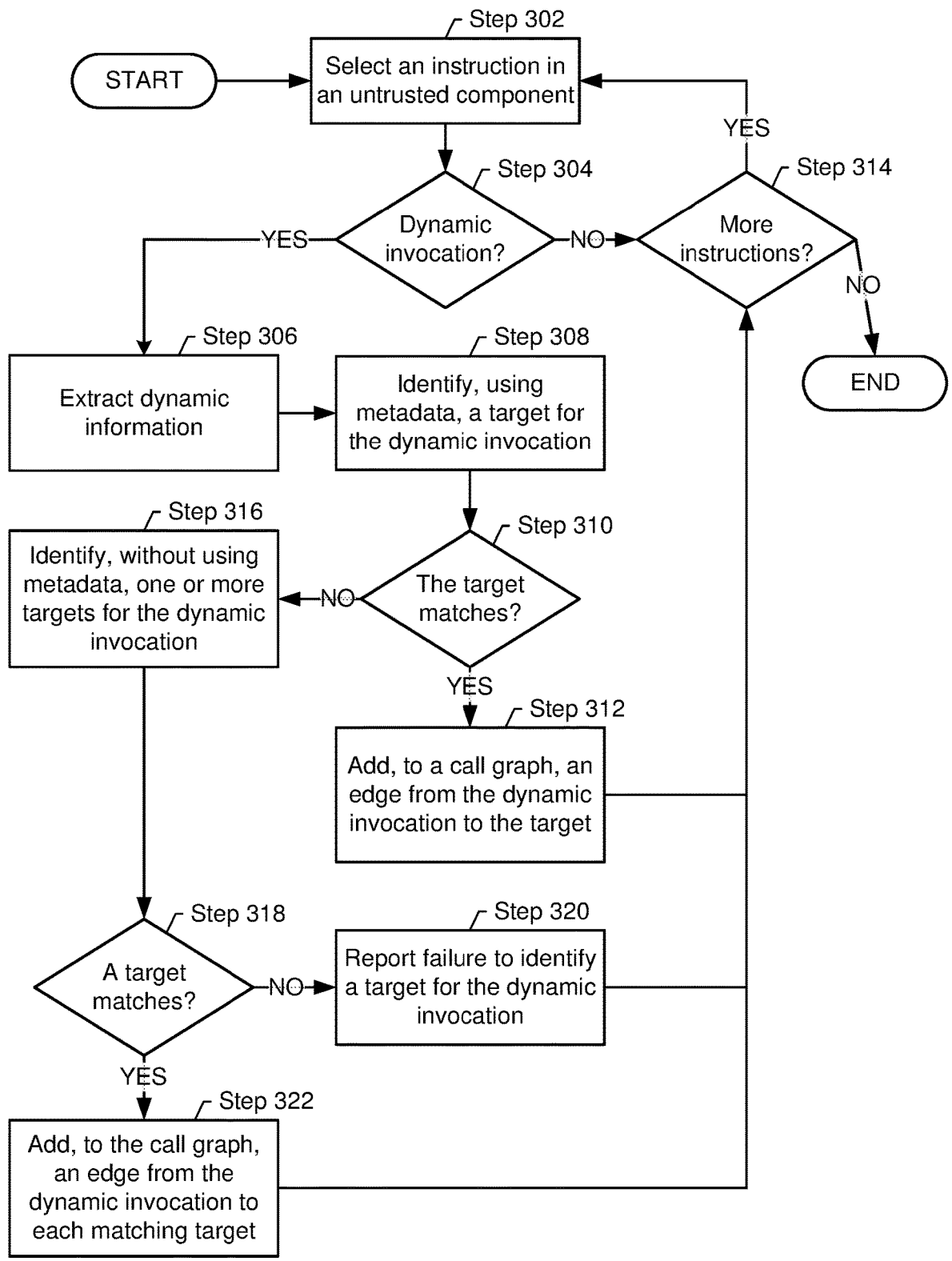

FIG. 3 shows a flowchart in accordance with one or more embodiments of the invention. The flowchart depicts a process for analyzing code. One or more of the steps in FIG. 3 may be performed by the components (e.g., the code splitter (104), translators (106), or static rewriter (110)) of the computer system (100), discussed above in reference to FIG. 1. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 302, an instruction in one of the untrusted components is selected (see description of Step 200 above). In one or more embodiments, each instruction in an untrusted component is selected in successive iterations of Step 302. In one or more embodiments, the instructions selected in Step 302 are limited to instructions that include an entry in a list of keywords (e.g., a list specific to a programming language and/or framework) known to correspond to dynamic invocations.

If, in Step 304, it is determined that the selected instruction is a dynamic invocation, then Step 306 below is executed. Otherwise, if Step 304 determines that the selected instruction is not a dynamic invocation, then Step 314 below is executed.

In Step 306, dynamic information is extracted from the dynamic invocation (see description of Step 204 above).

In Step 308, a target for the dynamic invocation is identified using metadata (see description of Step 206 above).

If, in Step 310, it is determined that the target matches the dynamic invocation (see description of Step 208 above), then Step 312 below is executed. Otherwise, if Step 310 determines that the target does not match the dynamic invocation, then Step 316 below is executed. For example, the target fails to match the dynamic invocation when the target is not reachable within the scope of the dynamic invocation or the target has a signature that fails to match the dynamic information extracted in Step 306 above.

In Step 312, an edge from the dynamic invocation to the target is added to a call graph (see description of Step 210 above).

In Step 314, if it is determined that there are additional instructions in untrusted components that have not yet been selected, then Step 302 is again executed to select another instruction.

In Step 316, one or more targets for the dynamic invocation are identified without using metadata. That is, after failing to identify a unique target that matches the dynamic invocation using metadata, the static rewriter may search for multiple matching targets without using metadata. See the description of Step 208 above for the criteria for determining when a target matches the dynamic invocation.

The search for matching targets may proceed relative to locations in a file system of the computer system specified by one or more environment variables. For example, the Java Classpath environment variable may specify directories that may be used to search for class files that may include candidate targets.

If, in Step 318, it is determined that one or more of the targets identified in Step 316 above match the dynamic invocation, then Step 322 below is executed. Otherwise, if Step 318 determines that none of the targets match the dynamic invocation, then Step 320 is executed.

In Step 320, a failure to identify a target match for the dynamic invocation is reported. The static rewriter may generate an error report that includes the dynamic invocation and the metadata. In one or more embodiments, the failure to match may be due to a requirement that an additional software component be provided at runtime. For example, the additional software component may include the intended target for the dynamic invocation. In one or more embodiments, in response to the failure to match, the static rewriter may request that a user explicitly specify an intended target for the dynamic invocation. Then, the static rewriter may add a call graph edge between the dynamic invocation and the user-provided target.

Step 314 above is then executed to continue processing instructions in untrusted components.

In Step 322, an edge from the dynamic invocation to each matching target is added to the call graph (see description of Step 312 above). That is, in the absence of a unique matching target identified using metadata, the static rewriter may conservatively overapproximate the call graph by adding an edge to the call graph corresponding to each target identified in Step 316 above that matches the dynamic invocation. Step 314 above is then executed to continue processing instructions in untrusted components.

The following example is for explanatory purposes only and not intended to limit the scope of the invention. FIG. 4A, FIG. 4B, FIG. 4C, and FIG. 4D show an implementation example in accordance with one or more embodiments of the invention.

Figure 4A:
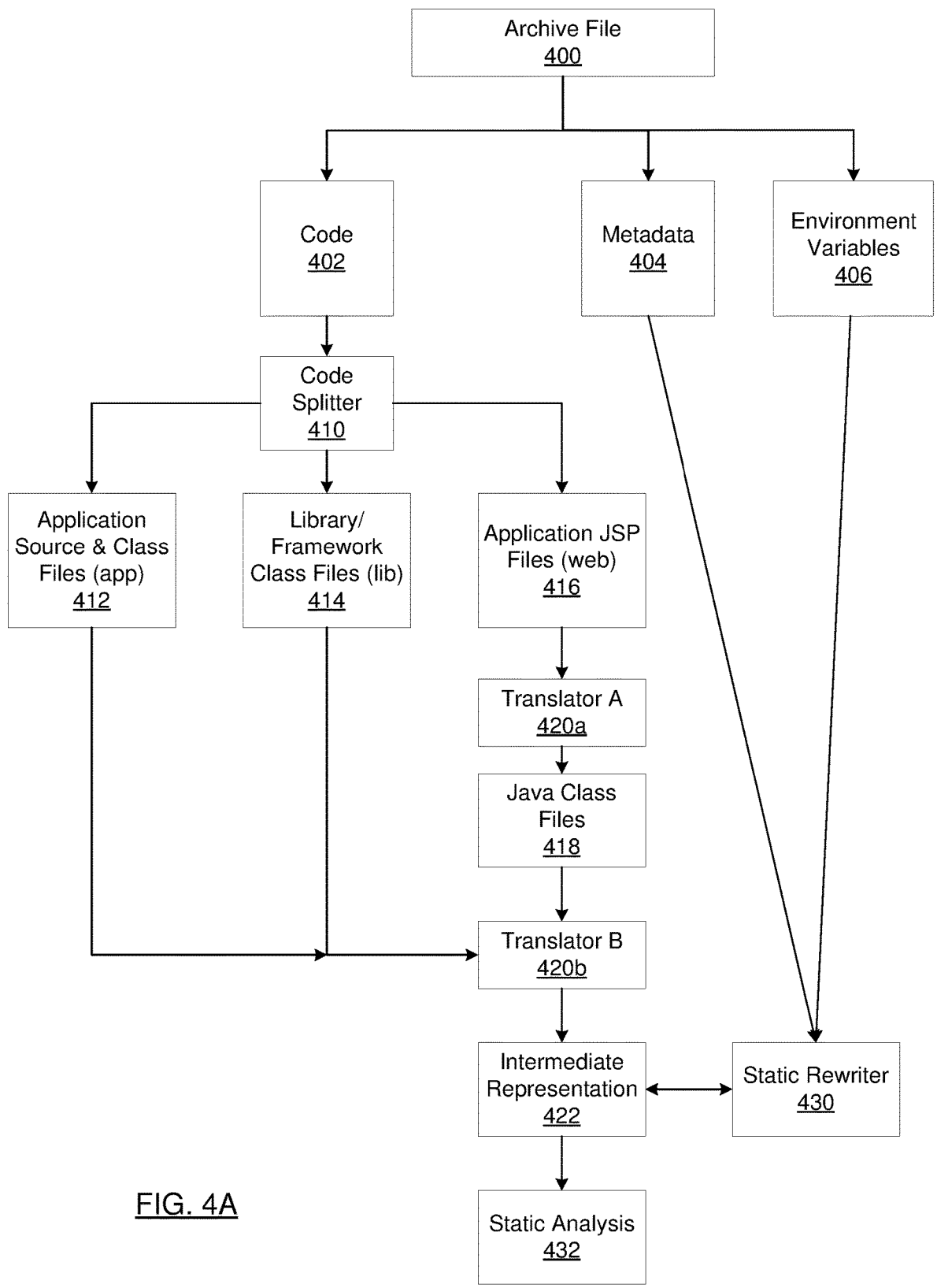

FIG. 4A illustrates the processing of an archive file (400) that aggregates code (402) ((112) in FIG. 1), metadata (404) ((122) in FIG. 1), and environment variables (406) ((124) in FIG. 1). The archive file (400) includes a Java Enterprise Edition (JEE) application represented in the Enterprise ARchive (EAR) format (e.g., other possible formats are Java ARchive (JAR) format, Web ARchive (WAR) format, etc.). The code splitter (410) ((104) in FIG. 1) divides the code (402) into application source & class files (412), library/framework class files (414), and application Java Server Page (JSP) files (416). Based on user settings indicating which components the user considers "trustworthy", the code splitter (410) assigns the application source & class files (412) to the app directory of the file system of the computer system, assigns the library/framework class files (414) to the lib directory, and extracts the application JSP files (416) to the web directory. The library/framework class files (414) are the trusted components ((114) in FIG. 1). The application source & class files (412) and application JSP files (416) are the untrusted components ((116) in FIG. 1). To facilitate the processing of the application JSP files (416), translator A (420a) (one of the translators (106) in FIG. 1) translates the application JSP files (416) to Java class files (418).

Translator B (420b) generates an intermediate representation (422) from the application source & class files (412), the library/framework class files (414), and the Java class files (418). The static rewriter (430) ((110) in FIG. 1) then modifies a call graph of the intermediate representation (422) using the metadata (404) and the environment variables (406), as illustrated in FIG. 4B, FIG. 4C, and FIG. 4D. Based on a user setting, the static rewriter (430) only analyzes dynamic invocations in the untrusted components. Finally, the intermediate representation (422) is used when performing a static analysis (432).

FIG. 4B, FIG. 4C, FIG. 4D, FIG. 4E, and FIG. 4F illustrate an example based on the Oracle Application Framework (OAF), which is a model-view-controller (MVC) framework built using Java Enterprise Edition (JEE) technologies. As shown in FIG. 4B, the metadata (450) identifies a component class (452), ExampleAMImpl, which the static rewriter will use to resolve dynamic invocations. FIG. 4C shows code (460) that includes an architectural specification (462), in this case, a base class, OAApplicationModuleImpl, which is extended by two different component classes: ExampleAMImpl and OtherAMImpl. Each component class defines a target (464a, 464b) that implements the doSomething method. When the application module is instantiated, the component class (452) specified by the metadata (450) is used to select the class ExampleAMImpl to implement the base class, OAApplicationModuleImpl (i.e., the architectural specification (462)). The application module instantiation point (466) is illustrated in FIG. 4D. Thus, the dynamic invocation (468) of the doSomething method applied to the instantiated application module is resolved to target A (464a), based on the specification of the component class (452) ExampleAMImpl by the metadata (450).

Figure 4E:
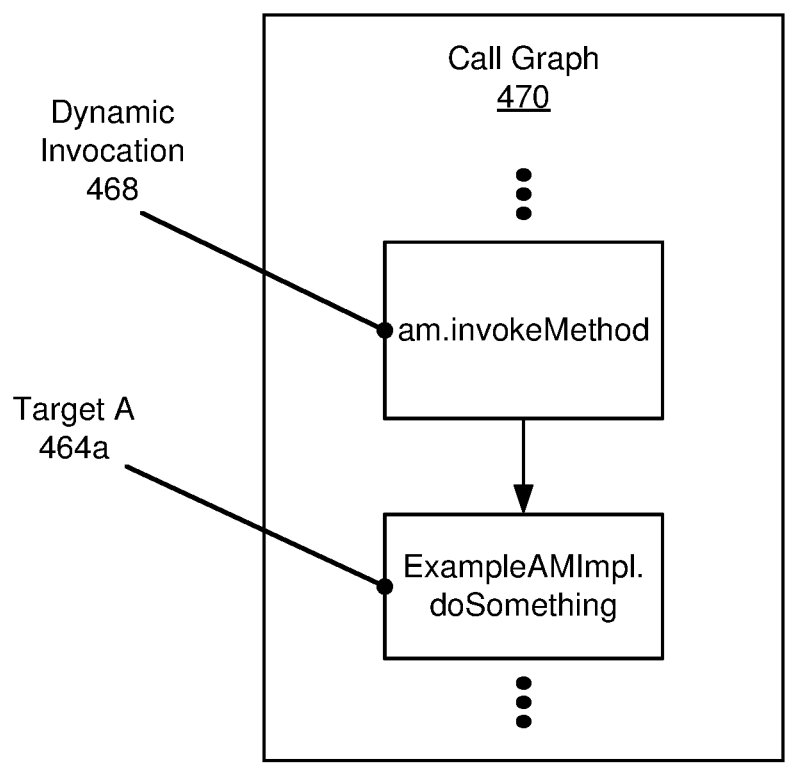

FIG. 4E illustrates a scenario where the metadata (450) matches the dynamic invocation (468). The static rewriter adds an edge connecting the dynamic invocation (468) and target A (464a) to the call graph (470). Thus, without executing the code (460), the call graph (470) is made more precise and complete using the metadata (450) to resolve the dynamic invocation (468) to target A (464a).

Figure 4F:
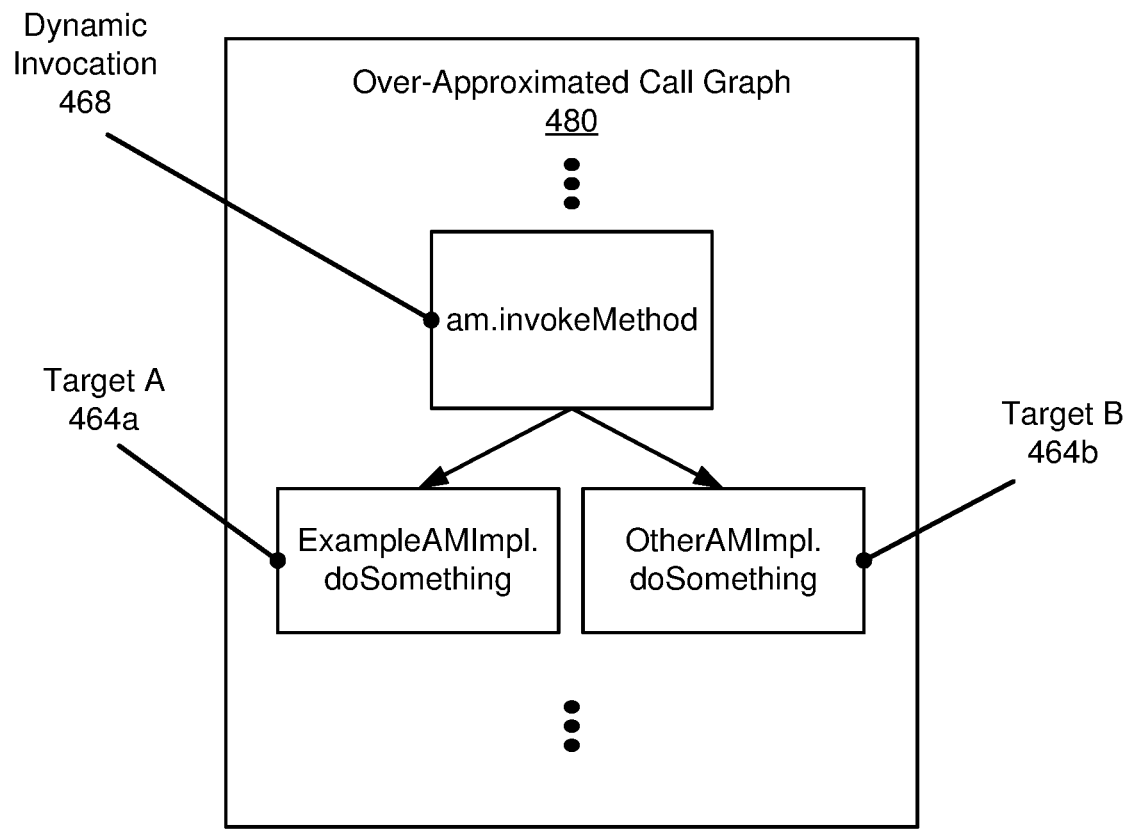

FIG. 4F illustrates an alternate scenario where the metadata (450) is missing or fails to match the dynamic invocation (468). In the alternate scenario, the static rewriter attempts to add edges to an over-approximated call graph (480) to account for all possible execution paths from the dynamic invocation (468) to potential targets (464a, 464b). The static rewriter searches for potential targets within the code (460) with names and signatures matching the name and signature of the dynamic invocation (468) (e.g., functions with a string argument and a Boolean argument that return void). FIG. 4F illustrates the addition of edges connecting the dynamic invocation (468) and both targets (464a, 464b) to the over-approximated call graph (480).

Figure 5A:
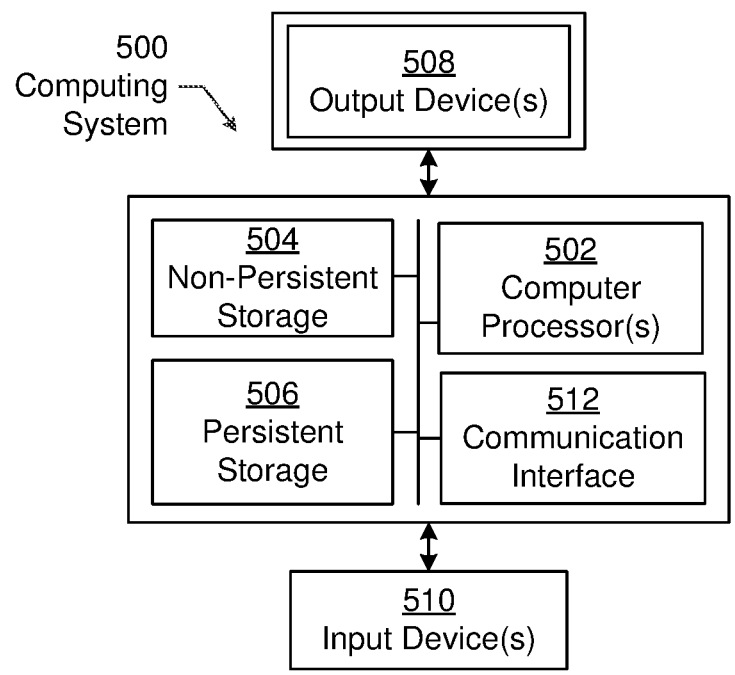
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
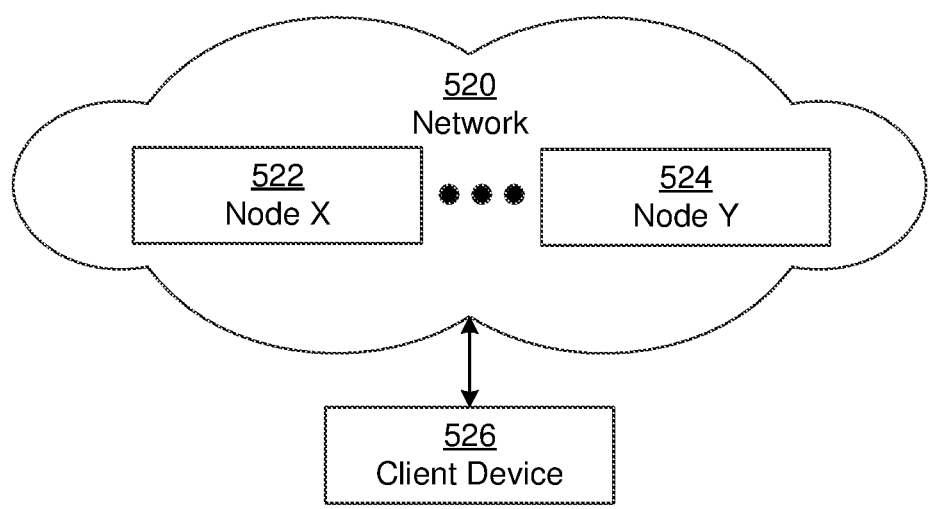

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    dividing source code into trusted and untrusted components;
    identifying, by performing a static analysis of the source code without executing the source code, a first dynamic invocation in a first component of the source code, wherein the first component is one of the untrusted components, wherein the first dynamic invocation corresponds to an architectural specification of the source code;
    extracting, by the static analysis and from the first dynamic invocation, a first signature comprising a series of parameters each having a type;
    identifying, by the static analysis and using the first signature and first metadata comprising an identifier of a second component of the source code, a first target for the first dynamic invocation, wherein the first target is comprised by the second component of the source code;
    determining, by the static analysis, that the first target comprises a second signature that matches the first signature by determining that the first target implements the architectural specification; and
    in response to determining that the first target comprises a second signature that matches the first signature, adding, by the static analysis, to a call graph generated statically from the source code, an edge from the first dynamic invocation to the first target.

2. The method of claim 1, further comprising:
    replacing, with a stub, a call from the first component to one of the trusted components.

3. The method of claim 1, further comprising:
    identifying a second dynamic invocation in a third component of the source code;
    extracting second dynamic information from the second dynamic invocation;
    failing to identify, using the second dynamic information and second metadata describing a dynamic behavior of the source code, a target for the second dynamic invocation;
    in response to the failure to identify a target, identifying, using the second dynamic information and an environment variable, one or more targets for the second dynamic invocation;
    determining that the one or more targets match the second dynamic invocation; and
    in response to determining that the one or more targets match the second dynamic invocation, adding, to the call graph, an edge from the second dynamic invocation to each of the one or more targets.

4. The method of claim 1, further comprising:
    identifying a second dynamic invocation in a third component of the source code;
    extracting second dynamic information from the second dynamic invocation;
    failing to identify, using the second dynamic information and second metadata describing a dynamic behavior of the source code, a target for the second dynamic invocation; and
    in response to the failure, reporting a failure to identify a target for the second dynamic invocation.

5. The method of claim 1, wherein dividing the source code into trusted and untrusted components comprises:
    identifying, using a user setting, a first location in a file system of a computer system corresponding to the trusted components and a second location in the file system corresponding to the untrusted components.

6. The method of claim 1, further comprising:
    performing, using the call graph, a security analysis of the source code; and
    identifying, by the security analysis, a security vulnerability in the source code corresponding to the edge from the first dynamic invocation to the first target.

7. A system, comprising:
    a repository configured to store source code, first metadata comprising an identifier of a second component of the source code, and a call graph generated statically from the source code;
    a memory coupled to a processor;
    a code splitter, executing on the processor and using the memory, configured to divide the source code into trusted and untrusted components; and
    a static rewriter, executing on the processor and using the memory, configured to:
        identify, by performing a static analysis of the source code without executing the source code, a first dynamic invocation in a first component of the source code, wherein the first component is one of the untrusted components, wherein the first dynamic invocation corresponds to an architectural specification of the source code;

extract, by the static analysis and from the first dynamic invocation, a first signature comprising a series of parameters each having a type;

identify, by the static analysis and using the first signature and the first metadata, a first target for the first dynamic invocation, wherein the first target is comprised by the second component of the source code;

determine, by the static analysis, that the first target comprises a second signature that matches the first signature by determining that the first target implements the architectural specification; and in response to determining that the first target comprises a second signature that matches the first signature, add, by the static analysis, to the call graph, an edge from the first dynamic invocation to the first target.

8. The system of claim 7, further comprising a translator configured to replace, with a stub, a call from the first component to one of the trusted components.

9. The system of claim 7, wherein the static rewriter is further configured to:
identify a second dynamic invocation in a third component of the source code;
extract second dynamic information from the second dynamic invocation;
fail to identify, using the second dynamic information and second metadata describing a dynamic behavior of the source code, a target for the second dynamic invocation;
in response to the failure to identify a target, identify, using the second dynamic information and an environment variable, one or more targets for the second dynamic invocation;
determine that the one or more targets match the second dynamic invocation; and
in response to determining that the one or more targets match the second dynamic invocation, add, to the call graph, an edge from the second dynamic invocation to each of the one or more targets.

10. The system of claim 7, wherein the static rewriter is further configured to:
identify a second dynamic invocation in a third component of the source code;
extract second dynamic information from the second dynamic invocation;
fail to identify, using the second dynamic information and second metadata describing a dynamic behavior of the source code, a target for the second dynamic invocation; and
in response to the failure, report a failure to identify a target for the second dynamic invocation.

11. The system of claim 7, wherein the memory further comprises a file system, and wherein the code splitter is further configured to divide the source code into trusted and untrusted components by identifying, using a user setting, a first location in the file system corresponding to the trusted components and a second location in the file system corresponding to the untrusted components.

12. A non-transitory computer readable medium comprising instructions that, when executed by a processor, perform:
dividing source code into trusted and untrusted components;
identifying, by performing a static analysis of the source code without executing the source code, a first dynamic invocation in a first component of the source code, wherein the first component is one of the untrusted components, wherein the first dynamic invocation corresponds to an architectural specification of the source code;
extracting, by the static analysis and from the first dynamic invocation, a first signature comprising a series of parameters each having a type;
identifying, by the static analysis and using the first signature and first metadata comprising an identifier of a second component of the source code, a first target for the first dynamic invocation, wherein the first target is comprised by the second component of the source code;
determining, by the static analysis, that the first target comprises a second signature that matches the first signature by determining that the first target implements the architectural specification; and
in response to determining that the first target comprises a second signature that matches the first signature, adding, by the static analysis, to a call graph generated statically from the source code, an edge from the first dynamic invocation to the first target.

13. The non-transitory computer readable medium of claim 12, further comprising instructions that perform:
replacing, with a stub, a call from the first component to one of the trusted components.

14. The non-transitory computer readable medium of claim 12, further comprising instructions that perform:
identifying a second dynamic invocation in a third component of the source code;
extracting second dynamic information from the second dynamic invocation;
failing to identify, using the second dynamic information and second metadata describing a dynamic behavior of the source code, a target for the second dynamic invocation;
in response to the failure to identify a target, identifying, using the second dynamic information and an environment variable, one or more targets for the second dynamic invocation;
determining that the one or more targets match the second dynamic invocation; and
in response to determining that the one or more targets match the second dynamic invocation, adding, to the call graph, an edge from the second dynamic invocation to each of the one or more targets.

15. The non-transitory computer readable medium of claim 12, wherein dividing the source code into trusted and untrusted components comprises:
identifying, using a user setting, a first location in a file system of a computer system corresponding to the trusted components and a second location in the file system corresponding to the untrusted components.

* * * * *

UNITED STATES PATENT AND TRADEMARK OFFICE
CERTIFICATE OF CORRECTION

| | | |
|---|---|---|
| PATENT NO. | : 11,087,003 B2 | Page 1 of 1 |
| APPLICATION NO. | : 16/112220 | |
| DATED | : August 10, 2021 | |
| INVENTOR(S) | : Suess et al. | |

It is certified that error appears in the above-identified patent and that said Letters Patent is hereby corrected as shown below:

In the Specification

In Column 4, Line 46, delete "( );}" and insert -- ( ); } --, therefor.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*